Patented Dec. 16, 1941

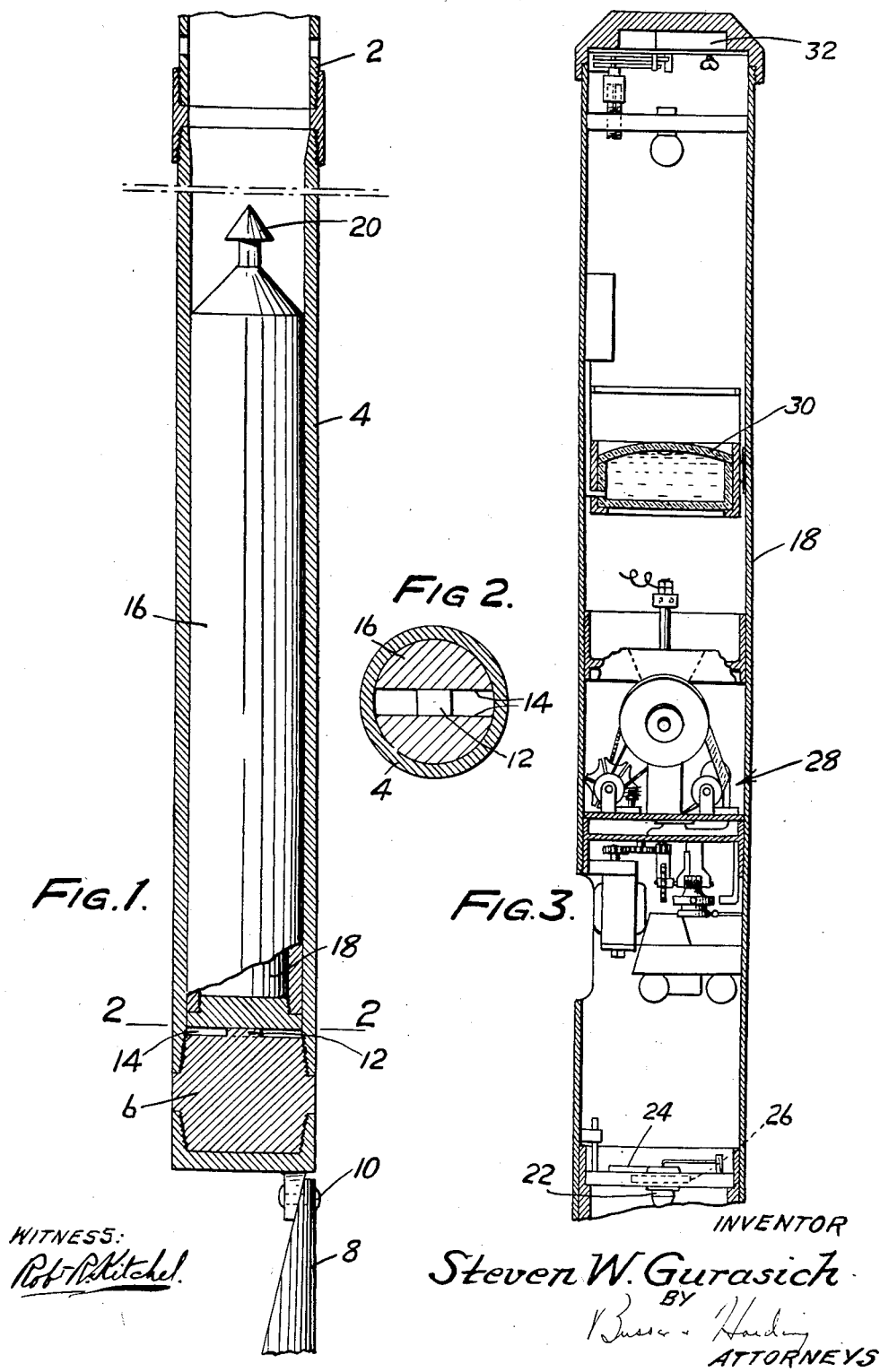

2,266,623

UNITED STATES PATENT OFFICE 2,266,623

METHOD OF SURVEYING BOREHOLES AND LOCATING TOOLS THEREIN

Steven W. Gurasich, Bakersfield, Calif., assignor to Sperry-Sun Well Surveying Company, Philadelphia, Pa., a corporation of Delaware Application September 14, 1938, Serial No. 229,902

10 Claims. (Cl. 255—1.8)

This invention relates to a method of surveying bore holes and locating tools therein, and has particular reference to the locating of whipstocks, knuckle joints or similar tools within bore holes in predetermined azimuthal positions.

The art of locating within bore holes tools such as whipstocks, knuckle joints or the like in predetermined azimuthal positions has involved the practice of numerous procedural methods involving steps and considerations which are well·exemplified by the disclosures of the patents to Kothny 2,006,556, Palmer and Kothny 2,012,138, Williston 2,012,152, and Hyer 2,120,670. A general reference to the disclosures of the above and similar patents will reveal first, the necessity for knowing the precise path of the bore hole, and particularly the slope of the lower end thereof, in order that the desired position of the directional drilling or similar tool may be ultimately secured, and secondly the maintenance of control over the tool while a check of its position is made in order that the tool may be finally set in the desired position for further operations. In addition to the problems arising directly in connection with the setting of a tool in predetermined position in the hole, there are auxiliary problems arising in connection with the use of well surveying apparatus, particularly in deep holes where it is subjected to possible damage or loss by collapse of the walls of an open hole, and also to damage of its records by reason of the high temperatures which may be encountered.

It is one object of the present invention to provide method and apparatus for positively insuring the location of a tool in a predetermined azimuthal position within a hole. The method in its most elaborate embodiment includes the performance of a relatively elaborate series of steps, many of which may be omitted, depending upon particular conditions. Simpler methods additionally form objects of the invention. By the performance of relatively few of the steps of the more elaborate sequence, there is provided a method of surveying a bore hole, irrespective of the location of any tool, which method has its advantages in the performance of a rapid survey in such fashion as to afford protection to an expensive instrument and secure records which will not be damaged by high temperatures encountered in deep holes which, with delay of the instrument at the depths where the highest temperatures are encountered, would result in destruction of the recording material, particularly when that material is photographic or when the apparatus involves elements which may be damaged by prolonged exposure to heat. Specifically, in accordance with the last mentioned considerations, the invention involves an improved method of running an oriented drill stem survey with a check on the accuracy of the survey by means of a directional instrument.

The above generally expressed objects will be best appreciated from consideration of a description of the preferred apparatus and particular methods of its use with reference to the accompanying drawing, in which:

Figure 1 is a vertical longitudinal section through the lower portion of a drill stem carrying a whipstock as an example of a directional tool, and including a well surveying instrument;

Figure 2 is a section taken on the plane the trace of which is indicated at 2—2 in Figure 1; and Figure 3 is an enlarged fragmentary sectional view showing the type of surveying apparatus which is preferably employed.

There is illustrated at 2 the lower portion of a sectional drill stem made up of lengths of tubing which, as pointed out below, may be aligned with each other during the makeup of the drill stem for the purpose of securing drill stem orientation of a surveying instrument or tool. The lowermost portion of the drill stem includes a sub indicated at 4, which is designed to receive a well surveying instrument later described. This sub is joined by means of a coupling 6 to a whipstock 8 which is secured to it through the medium of a rivet 10 of material which may be sheared to leave the whipstock in position within the hole. The whipstock is illustrated only by way of example, and any other directional tool may be secured to the lower end of the drill stem for azimuthal positioning within the bore hole by the method which will be outlined.

The coupling member 6 is illustrated in the present instance as provided with a key 12 adapted to be engaged by a keyway 14 formed in the bottom of the protective casing 16 of a well surveying instrument, generally designated at 18 and illustrated in greater detail in Figure 3. The protective casing 16 is provided with a spear head 20 adapted to be engaged by means of an overshot carried by a wire line for the purpose hereafter explained.

The surveying instrument 18 included within the protective casing 16 and illustrated in Figure 3 is preferably of the gyroscopic type, for example, of the type described in Williston and Nichols Patent 1,960,033, as modified in accordance with Kothny Patent 2,012,456 and of suitable size to enter a drill stem. This surveying instrument, which is of well-known construction, comprises a gyroscope the vertical spindle of which is indicated at 22 and which is provided with a pointer 24 adapted to be photographed against a scale simultaneously with a timepiece 26 by means of a camera indicated at 28 which also simultaneously photographs the bubble within a box level indicated at 30. In order to produce exposures substantially spaced in time in an adjustable fashion, there is provided the timing mechanism indicated at 32 which controls the motor operating the camera and controlling the illumination of the various instruments. For details of this apparatus reference may be had to the Williston and Nichols and Kothny Patents just mentioned.

To illustrate the most elaborate method in accordance with the present invention, let it be assumed that a whipstock is to be located within a bore hole which has been previously only roughly surveyed with the objective of deflecting the bore hole either from the vertical or into the vertical if it has been found to be deviating therefrom. Such condition might arise, for example, in a deep hole which has been only intermittently surveyed and the path of which is consequently not fully known, though it may have been ascertained that it is extending in an undesired direction, either vertical or sloping. Under such conditions, the proper azimuthal location of a whipstock may depend not only on the slope and direction of slope of the lowermost portion of the tool, but also upon the path of the entire hole. In accordance with the present invention, the complete problem of the proper location of the whipstock is solved in a simple and straightforward fashion by the use of the apparatus which has been disclosed.

The whipstock 8 is secured to the sub 4 in predetermined angular relationship thereto, there being provided suitable markings on the exteriors of the various parts to indicate their relative locations. The surveying instrument 18 properly operating is located in known position within its protective casing 16 and this casing is in turn located in predetermined position relative to the coupling member 6 and whipstock by causing the key way 14 to embrace the key 12. This assembly in which all the parts are lined up in predetermined relationship with each other (including the well surveying apparatus within its protective casing, the position of which is further indicated to the camera preferably by means of a marking on the gyroscope pointer scale or by means of the upper electrical lead to the gyroscope which is photographed with the gyroscope pointer 24) is then lowered into the bore hole upon a so-called oriented drill string in which the various fourble lengths are lined up with each other in known fashion by clamping upon them telescopes, or similar sights, sighted upon distant objects, or, alternatively, by sighting along the various sections of the drill stem. Thus, when the whipstock reaches the vertical position in which it is to be set its azimuthal position should theoretically be known except for two possible sources of error: first, any accumulation of errors in aligning the drill stem sections with each other, and second the error arising because of tortuosity in the event that the hole is of substantial skew form. This last named consideration is fully discussed in said Kothny Patent 2,006,556. Since with a moderately straight hole and with careful alignment of the drill stem sections, for example, fourble lengths, the error involved in this drill stem orientation of the surveying instrument and whipstock should be small, the whipstock may be assumed to be fairly close to its desired position, and secondly there will have been made, in effect, two mutually checking surveys of the course of the bore hole. First, forgetting that the drill stem has been oriented during the lowering, a survey will have been made by the simultaneous recording of the gyroscope pointer positions, the bubble in the level 30 and the time indicated by the timepiece 26, there being noted throughout the lowering of the drill stem the relationships of depth to time. An independent survey will also have been made, however, if the gyroscope is forgotten, since by reason of the orientation of the drill stem the position of the well surveying instrument in azimuth should be known for every depth and the path should be theoretically calculable by considering the records consisting of the photographs of the bubble in the level 30, the timepiece 26 and whatever marking (for example, the position of the gyroscope lead), which indicates the relationship of the surveying instrument to the drill stem.

As soon as the lowering is completed, an overshot is lowered by means of a wire line to engage the spear head 20 and the surveying instrument 16 is preferably rapidly removed through the drill stem while the drill stem is held stationary. The rapidity of the removal is preferably such that a number of checking readings may be made by the surveying instrument on its way out of the drill stem, its depth at various times being noted so as to make possible a correlation of the records with depth through the recording of the readings of the timepiece 26.

It may be noted at this point that the use of a wire line to raise the surveying instrument through the drill stem as soon as it reaches its lowermost position makes it possible to lower the well surveying instrument within the drill stem to secure both an oriented drill stem survey and also protect the surveying instrument against cave-ins, but nevertheless remove the instrument very rapidly to prevent damage to the record by reason of the temperatures encountered in a deep hole. Such temperatures may well be of the order of the boiling point of water at the atmospheric pressure existing in the surveying instrument and may result, for example, in the liberation of water from the photographic film used, resulting in damage to the film, and the formation of steam which will condense, when the instrument later cools, upon the mechanical parts thereof. Inasmuch as it takes some time for the temperature within the instrument to reach the temperature outside it will be obvious that the rapid removal of the surveying instrument to cooler portions of the tool will prevent damage of the type just indicated.

As soon as the surveying instrument is removed, it may be opened and the record developed and examined. Actually, three records are now secured, giving a complete history of the path of the bore hole. The first of these may be considered the record obtained during the lowering by the simultaneous recording of the gyroscope and level, together with the time, which may be translated into terms of depth. The second record may be considered that obtained by the orientation of the surveying instrument by the drill stem and consideration of the records of the level, the marking indicating the position of the instrument within the drill stem, and the time. The third record is the checking record produced as the instrument is raised on the wire line. In this record, of course, the azimuth is given by the gyroscope.

From the above records the path of the bore hole may be ascertained. Theoretically, they should agree, if the drill stem orientation was carried out properly, with the sole difference due to tortuosity which would create an error in the drill stem orientation record. By taking account of the tortuosity record, however, it can be readily determined whether the drill stem orientation record checks the gyroscope records, which latter should, of course check each other. Thus there is obtained a doubly checked record of the path of the hole.

Additionally, there is secured a definite record of the position which the whipstock occupies in the hole. If the drill stem orientation was carried out properly, the whipstock should be very closely in the position determined by the manipulations of the drill stem during its lowering. If, now, from consideration of the entire path of the bore hole it appears that the whipstock should be located in some other azimuthal position, it is only necessary to turn the drill stem through the calculated amount preferably causing it to move up and down in the well during the turning so as to take out any torsional strains and assure that the whipstock has moved in azimuthal direction to the same extent as the upper end of the drill stem. Thereupon the drill stem may be forced downwardly to cause the whipstock to enter the soil and the rivet 10 sheared off so that the drill stem may be raised, leaving the whipstock in predetermined position. In the event that some other tool, such as a directional drilling bit, is located in predetermined position by the above method, drilling may be effected after proper location of the tool by the rotation of the drill stem.

It will be obvious that in many cases the elaborate tool setting procedure just outlined is not necessary. For example, the method may be carried out without orientation of the drill string. In such case, the survey is effected by means of the instrument as it is lowered within the drill string and it will give a gyroscopic check upon the position of the tool, such as a whipstock, so that the procedure may be carried out the same as described above with the exception that there will not be secured a check upon the survey of the hole. Preferably, checking records are made when the instrument is being hauled out of the drill stem, but this may be omitted if desired. Nevertheless, the advantage is secured of simultaneously surveying the hole and determining the position of the whipstock, with the possibility of thereafter turning the drill stem to locate the whipstock or other tool in desired position, and also with the advantage of providing protection for the surveying instrument and its rapid removal to prevent damage by heat.

Still another broad aspect of the invention is presented. If, for example, the location of the tool is immaterial or no tool is lowered with the drill stem, there is provided, if drill stem orientation is used, a doubly checked survey of the path of a bore hole with the lowering of the surveying instrument with and within the drill stem, so that it is protected against cave-ins, and with its rapid removal to avoid damage by high temperatures. By causing records to be made both going into and coming out of the hole, there is secured the double check referred to above.

There are advantages, however, if a survey is made without orientation of the drill stem and merely if records are made during the lowering of the surveying apparatus with and within the drill stem. In such case, the well surveying apparatus is protected against damage due to caving of the walls of the hole and, nevertheless may be rapidly removed (as compared with the slow removal with the drill stem) by means of a wire line carrying an overshot adapted to engage the spear head 20.

Still another alternative is offered in the above cases when drill stem orientation is used either for tool setting or surveying if a magnetic type of instrument is used instead of the gyroscopic type and the sub 4 and the other elements of the drill stem adjacent the instrument are formed of non-magnetic material so that the magnetic compass in the instrument is free to align itself with the field of the earth. Under such circumstances, as the drill stem is lowered with the instrument a magnetic survey is made and, at the same time, an oriented drill stem survey, one of which may be checked against the other. Removal by means of a wire line in such case, however, will not enable checking readings to be made during the raising of the insrument, but will have the advantage of making it possible to remove the instrument from the drill stem rapidly to avoid the detrimental effects of high temperatures. The latter advantage may also be secured if a magnetic type of instrument is lowered, even without drill stem orientation, but within the drill stem in a non-magnetic portion thereof.

Instead of providing a non-magnetic sub in the method described above, a magnetic surveying instrument may be carried in the lowermost section of a drill stem in such fashion that its magnetic compass projects beyond the lower end of the stem or bit so as not to be affected by the magnetic materials of the stem or bit. In such case, by having it seat on a shoulder in the stem, it may be removed readily by an overshot.

What I claim and desire to protect by Letters Patent is:

1. The method comprising lowering a directional well surveying instrument by means of a sectional hollow drill stem, the sections of which are lined up relatively to each other and said instrument so that the orientation of said instrument is at least approximately determinable during the lowering operation, causing said instrument to make a series of records of inclination at various depths during such lowering, removing said instrument from the hole through the drill stem while the drill stem remains in the hole, and causing said instrument to make a series of records of both inclination and direction at various depths during such removal.

2. The method comprising lowering a directional well surveying instrument by means of a sectional hollow drill stem, causing said instrument to make a series of records of inclination at various depths during such lowering, removing said instrument from the hole through the drill stem while the drill stem remains in the hole, and causing said instrument to make a series of records of both inclination and direction at various depths during such removal.

3. The method comprising lowering a directional well surveying instrument by means of a sectional hollow drill stem, causing said instrument to make a series of records of inclination at various depths during such lowering, and removing said instrument from the hole through the drill stem while the drill stem remains in the hole.

4. The method comprising lowering a well surveying instrument by means of a sectional hollow drill stem the sections of which are lined up relatively to each other and said instrument so that the orientation of said instrument is at least approximately determinable during the lowering operation, causing said instrument to make a series of records of inclination at various depths during such lowering, and removing said instrument from the hole through the drill stem while the drill stem remains in the hole.

5. The method comprising lowering a directional well surveying instrument and a tool by means of a sectional hollow drill stem, the sections of which are lined up relatively to each other and said instrument and tool so that the orientation of said instrument and tool is at least approximately determinable during the lowering operation, causing said instrument to make a series of records of inclination at various depths during such lowering, removing said instrument from the hole through the drill stem while the drill stem remains in the hole, causing said instrument to make a series of records of both inclination and direction at various depths during such removal, and locating said tool in predetermined azimuthal position by manipulation of said drill stem.

6. The method comprising lowering a well surveying instrument and a tool by means of a sectional hollow drill stem, the sections of which are lined up relatively to each other and said instrument and tool so that the orientation of said instrument and tool is at least approximately determinable during the lowering operation, causing said instrument to make a series of records of inclination at various depths during such lowering, removing said instrument from the hole through the drill stem while the drill stem remains in the hole, and locating said tool in predetermined azimuthal position by manipulation of said drill stem.

7. The method comprising lowering a directional well surveying instrument and a tool by means of a sectional hollow drill stem, said well surveying instrument and tool being lined up relatively to each other, removing said instrument from the hole through the drill stem while the drill stem remains in the hole, causing said instrument to make a series of records of both inclination and direction at various depths during such removal, and locating said tool in predetermined azimuthal position by manipulation of said drill stem.

8. The method comprising lowering a directional well surveying instrument and a tool by means of a sectional hollow drill stem, the sections of which are lined up relatively to each other and said instrument and tool so that the orientation of said instrument and tool is at least approximately determinable during the lowering operation, removing said instrument from the hole through the drill stem while the drill stem remains in the hole, causing said instrument to make a series of records of both inclination and direction at various depths during such removal, and locating said tool in predetermined azimuthal position by manipulation of said drill stem.

9. The method comprising lowering and raising a well surveying instrument within a bore hole, the instrument being moved in one direction supported by a sectional hollow drill stem, and being moved in the opposite direction through the drill stem while the drill stem is in the hole, and causing said instrument to make a series of records of inclination at various depths during the period of its support by the drill stem.

10. The method comprising lowering and raising a well surveying instrument within a bore hole, the instrument being moved in one direction supported by a sectional hollow drill stem the sections of which are lined up relatively to each other and said instrument so that the orientation of said instrument is at least approximately determinable during such movement, and being moved in the opposite direction through the drill stem while the drill stem is in the hole, and causing said instrument to make a series of records of inclination at various depths during the period of its support by the drill stem.

STEVEN W. GURASICH.